United States Patent
Holtgrefe, Sr.

(10) Patent No.: US 7,204,053 B1
(45) Date of Patent: Apr. 17, 2007

(54) MOLE TRAP

(76) Inventor: Thomas H. Holtgrefe, Sr., 5447 Philloret Dr., Cincinnati, OH (US) 45239

( * ) Notice: Subject to any disclaimer, the term of this patent is extended or adjusted under 35 U.S.C. 154(b) by 0 days.

(21) Appl. No.: 11/351,531

(22) Filed: Feb. 10, 2006

(51) Int. Cl.
*A01M 23/26* (2006.01)

(52) U.S. Cl. ................................. 43/88; 43/94
(58) Field of Classification Search ............ 43/77, 43/80, 85, 88, 89, 91, 94, 95
See application file for complete search history.

(56) References Cited

U.S. PATENT DOCUMENTS

| | | | |
|---|---|---|---|
| 69,878 A | 10/1867 | Westcott | |
| 280,811 A * | 7/1883 | Gilleland | 43/94 |
| 288,225 A * | 11/1883 | Gilleland | 43/94 |
| 472,038 A * | 4/1892 | Durston | 43/94 |
| 615,851 A | 12/1898 | Hooker | |
| 1,296,407 A * | 3/1919 | Layton | 43/88 |
| 1,385,024 A | 7/1921 | Russell | |
| 1,557,043 A | 10/1925 | Graham | |
| 1,762,783 A | 6/1930 | Kascak | |
| 1,764,225 A | 6/1930 | Raymond | |
| 1,923,039 A * | 8/1933 | Peterson | 43/80 |
| 1,924,241 A | 8/1933 | Hassler | |
| 2,048,135 A * | 7/1936 | Mygrants | 43/94 |
| 2,525,383 A * | 10/1950 | Troutman | 43/94 |
| 3,529,377 A * | 9/1970 | Anderson | 43/91 |
| 4,765,087 A * | 8/1988 | Holtgrefe, Sr. | 43/94 |
| 5,307,587 A | 5/1994 | Zeiger et al. | |
| 6,578,314 B1 | 6/2003 | Schmidt | |
| 6,868,633 B2 * | 3/2005 | Schroedl | 43/88 |

OTHER PUBLICATIONS

Screenshots from www.greentreediscounts.com, relating to VICTOR brand mole traps, printed Dec. 30, 2004.
Office Action dated Jul. 25, 2005 for U.S. Appl. No. 11/031,442 filed Jan. 7, 2005.
Office Action dated Nov. 7, 2005 for U.S. Appl. No. 11/031,442, filed Jan. 7, 2005.

* cited by examiner

*Primary Examiner*—Kurt Rowan
(74) *Attorney, Agent, or Firm*—Frost Brown Todd LLC

(57) ABSTRACT

A mole trap has a pair of spring-loaded jaws. A platform is pivotally connected to the jaws to limit the travel of the trap into the ground and to stabilize the trap on the ground when it is set. A lever assembly forces the jaws open. A trigger mechanism includes a clasp member configured to selectively hold the lever assembly in a set position. The trap may be positioned such that a portion of the trigger mechanism is on the ground above a mole burrow. The disturbance of a mole traveling beneath the trigger causes the clasp member to disengage the lever assembly, permitting the lever assembly to collapse, thereby permitting the jaws to close and destroy the animal.

18 Claims, 8 Drawing Sheets

MOLE TRAP

BACKGROUND OF THE INVENTION

Embodiments of the present invention relate to an animal trap that may be well-suited for destroying or otherwise trapping moles in their burrows or other animals. While many traps have been made and used, it is believed that no one prior to the inventor has made or used the trap described in the appended claims.

BRIEF DESCRIPTION OF THE DRAWINGS

While the specification concludes with claims that particularly point out and distinctly claim the invention, it is believed the present invention will be better understood from the following description taken in conjunction with the accompanying drawings, in which like reference numerals identify the same elements. The drawings and detailed description which follow are intended to be merely illustrative and are not intended to limit the scope of the invention as set forth in the appended claims.

Figure 1:
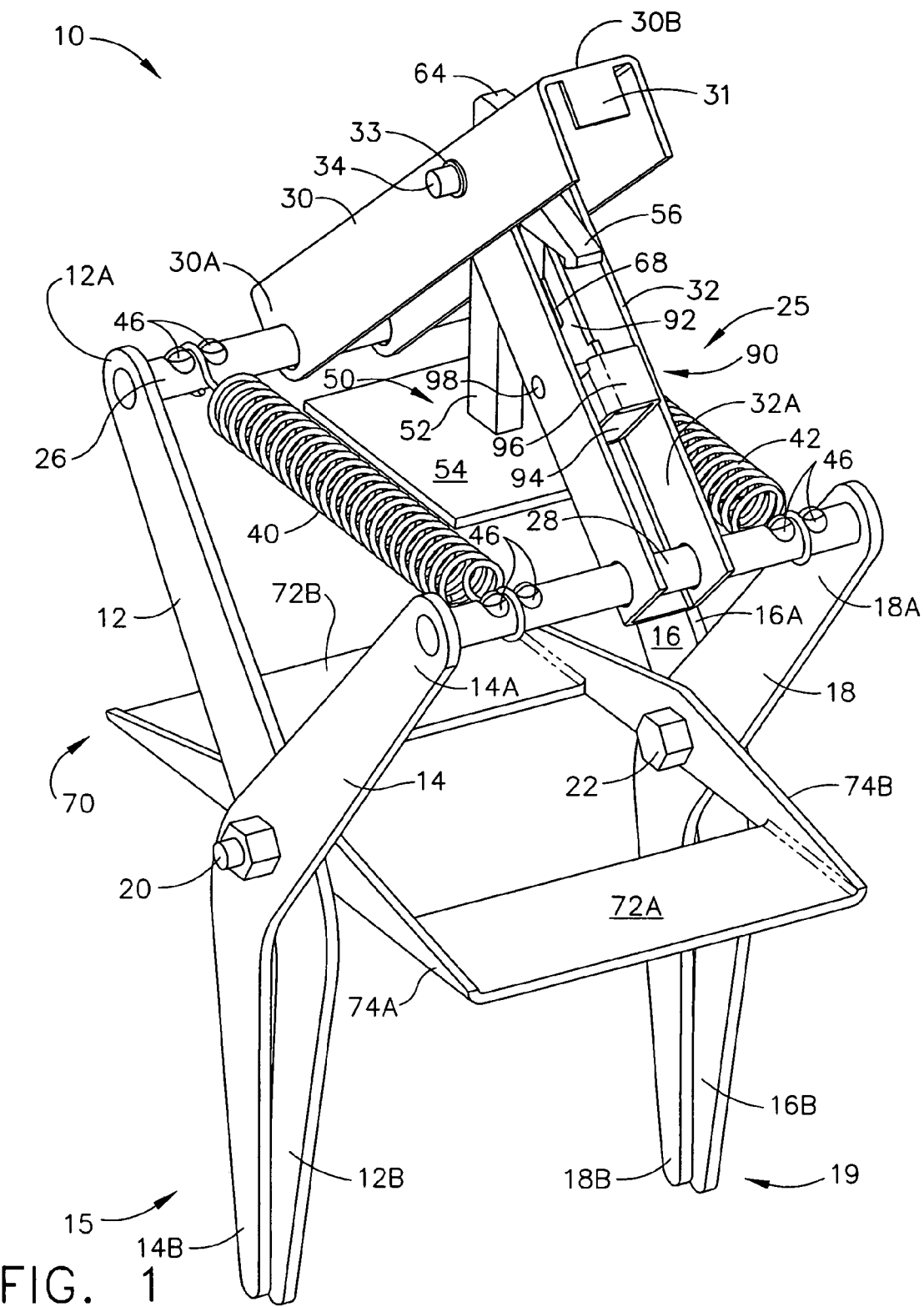
FIG. 1 is a perspective view of a mole trap in a closed position.

Reference will now be made in detail to the present preferred embodiment of the invention, an example of which is illustrated in the accompanying drawings.

DETAILED DESCRIPTION OF EMBODIMENTS OF THE INVENTION

The following description should not be used to limit the scope of the present invention. Other examples, features, aspects, embodiments, and advantages of the invention will become apparent to those skilled in the art from the following description, which includes by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. It should therefore be understood that the inventor contemplates a variety of embodiments that are not explicitly disclosed herein.

FIGS. 1–6 show an exemplary mole trap 10. Mole trap 10 of this example includes first angled member 12 and second angled member 14. Angled member 12 terminates in support end 12A and opposite blade end 12B. By being "angled," angled member 12 has an offset between support end 12A and support end 12B. In the present example, near the mid-point of angled member 12, angled member 12 is angled or bent to form an angle greater than 90°. However, it will be appreciated that other angular configurations for angled member 12 may be used. It will also be appreciated that angled member 12 need not be angled or bent at all. To the extent that angled member 12 is angled or bent, such angle or bend may be located at any suitable position along angled member 12.

In a similar manner, angled member 14 includes support end 14A and blade end 14B. Angled members 12 and 14 are hinged together by fastener 20 to form first jaw 15. Any suitable fastener or securing means, including but not limited to, nuts, protrusions, caps, cotter pins, and the like, may be used.

Mole trap 10 also includes angled members 16 and 18 which are hinged together about fastener 22 to form second jaw 19. As will be apparent to those of ordinary skill in the art, angled members 16 and 18 are configured in a fashion similar to the configuration of angled members 12 and 14. In one embodiment, each angled member 12, 14, 16, and 18, includes a radiused edge. Alternatively, any edge of angled members 12, 14, 16, and 18 may have any other suitable configuration.

It will be appreciated that any suitable means for facilitating pivotal movement of angled members (e.g., pivotal movement of angled member 12 with respect to angled member 14 and/or pivotal movement of angled member 16 with respect to angled member 18) may be used. By way of example only, nylon washers may be positioned at any suitable location about fasteners 20 or 22 to facilitate such pivotal movement. Other suitable means for facilitating pivotal movement, including but not limited to various structures and materials, will be apparent to those of ordinary skill in the art.

Lever assembly 25 is connected to support ends 12A, 14A, 16A, and 18A of first and second jaws 15 and 19 to load and set trap 10. Lever assembly 25 includes first connecting rod 26 which is secured to support ends 12A and 16A. Second connecting rod 28 is secured to support ends 14A and 18A. First lever 30 is pivotally connected at its first end 30A to first connecting rod 26. First lever 30 further comprises a tab 31, which extends generally downward from second end 30B of first lever 30. Second lever 32 is pivotally connected at its first end 32A to second connecting rod 28. In one embodiment, connecting rods 26 and 28 include protrusions, between which levers 30 and 32 are positioned, to prevent lateral movement of levers 30 and 32 along connecting rods 26 and 28. Any suitable alternative to protrusions may be used.

While connecting rods 26 and 28 of the present example are generally cylindraceous, it will be appreciated that any other suitable shape or configuration may be used. By way of example only, connecting rods 26 and 28 may have a generally square or triangular cross-section, or a cross-section of any other shape. In addition, connecting rods 26 and 28 need not be substantially straight. For instance, connecting rods 26 and 28 may be angled or curved. Still other suitable configurations of connecting rods 26 and 28 will be apparent to those of ordinary skill in the art.

In the present example, support bar 34 is pivotally connected to first lever 30 near second end 30B of first lever 30. Of course, support bar 34 may be pivotally connected to first lever 30 at any other location along first lever 30. Second end 32B of second lever 32 is also pivotally connected to support bar 34. Retaining rings 33 may be used to retain support bar 34 with respect to the first lever 30. Alternatively, any other fastener, retainer, or securing means, including but not limited to protrusions, caps, cotter pins, and the like, may be used.

Coil springs 40 and 42 are secured to the first and second connecting rods 26 and 28 on opposite sides of the first and second levers 30 and 32. It will be appreciated that springs 40 and 42 urge first jaw 15 and second jaw 19 toward a closed position. As illustrated in FIG. 1, springs 40 and 42 are positioned between protrusions 46 along support rods 26 and 28 to prevent lateral movement of springs 40 and 42 along support rods 26 and 28. Any suitable alternative to protrusions 44 may be used. In one embodiment, springs 40 and 42 are in tension when first and second jaws 15 and 19 are closed. By way of example only, such tension may be in the range of approximately 20 to 40 pounds. Such tension may prevent a mole from escaping a closed trap 10 and/or may effect severing of a mole upon closure of jaws 15 and 19 upon the mole. Alternatively, trap 10 and/or springs 40 and 42 may be configured so that they are not in tension when first and second jaws 15 and 19 are closed. It is understood that any other type of springs or resilient members may be utilized with trap 10. Also, it is possible to incorporate only one spring or resilient member, or any suitable number of springs or resilient members, with trap 10. As used herein, the phrase "resilient member" shall be read to include any structure, device, material, or the like, which is configured to urge at least two members or objects, which are in communication with the resilient member, toward or away from each other. In other words, where a resilient member is in communication with two or more objects, it will tend to urge movement of one of the objects relative another one of the objects, regardless of whether such movement actually occurs. Of course, any suitable alternative to resilient members may be used.

As shown in FIGS. 1–3, 5–6, and 8–9, trigger mechanism, indicated generally at 50, is pivotally connected to support bar 34. Trigger mechanism 50 includes trigger rod 52 pivotally connected at its upper end to support bar 34. Trigger rod 52 may have any suitable cross sectional shape, such as generally square or circular, by way of example only. Trigger mechanism 50 further includes plate 54 connected to the lower end of trigger rod 52. While plate 54 is shown as being generally rectangular, any suitable shape may be used, such as circular or elliptical, by way of example only. Plate 54 may be secured to trigger rod 52 by welding, screwing, or in any other suitable way. Alternatively, trigger plate 54 and trigger rod 52 may be integrally formed. Trigger plate 54 of the present example is configured to have a width that approximates the width of an average mole run 82. For instance, in one embodiment, trigger plate 54 is approximately 2¾"×1⅝". Such dimensions may also provide an ideal amount of surface area for receiving upward forces communicated from a mole, as will be described in greater detail below. Of course, any other dimensions may be used.

In the present example, trigger arm 56 extends generally perpendicularly from the upper end of trigger rod 52. Alternatively, any suitable angular relation between trigger arm 56 and trigger rod 52 may be used. It will be appreciated that trigger arm 56 may provide leverage for the exertion of a generally upward force by trigger mechanism 50 on first lever 30 and/or support bar 34. It will also be appreciated that trigger arm 56 may provide stability of and/or inhibit movement of trigger rod 52. In another embodiment, trigger arm 56 is omitted.

As shown, trigger arm 56 and trigger rod 52 generally intersect at opening 62, through which support bar 34 passes. In the present example, opening 62 is elongate, providing a loose fit between trigger rod 52 and support bar 34. This loose fit may provide lost motion, or otherwise permit upward movement of trigger rod 52, when trigger rod 52 is urged upwardly. Alternatively, opening 62 may not be elongate, and any suitable fit between trigger rod 52 and support bar 34 may be used.

Trigger mechanism 50 further includes protuberance 64 located generally above opening 62. In addition, trigger mechanism 50 comprises a pin 65, which extends transversely through trigger rod 52 generally below opening 52. Alternatively, any suitable alternative structure may be used to substitute or supplement pin 65. For instance, trigger rod 52 may comprise an integral protuberance or other feature extending transversely relative to trigger rod 52. Still other suitable transverse members will be apparent to those of ordinary skill in the art.

Trigger mechanism 50 of the present example further comprises clasp member 90. Clasp member 90 comprises a pair of arms 92, an upright portion 94, and a clasping portion 96. Upright portion 94 is generally perpendicular to arms 92; and clasping portion 96 is generally parallel with arms 92. Of course, any other suitable relationships between these components may be used. Each arm 92 has a step 95 located adjacent to upright portion 94. A hinge pin 98 is inserted through clasp member 90 proximate to the intersection of arms 92 and upright portion 94. In the present example, hinge pin 98 is engaged with second lever 32. Clasp member 90 is permitted to pivot or rotate about hinge pin 98 within second lever 32. Accordingly, it will be appreciated that hinge pin 98 may be fixed relative to clasp member 90 or relative to second lever 32.

Figure 8:
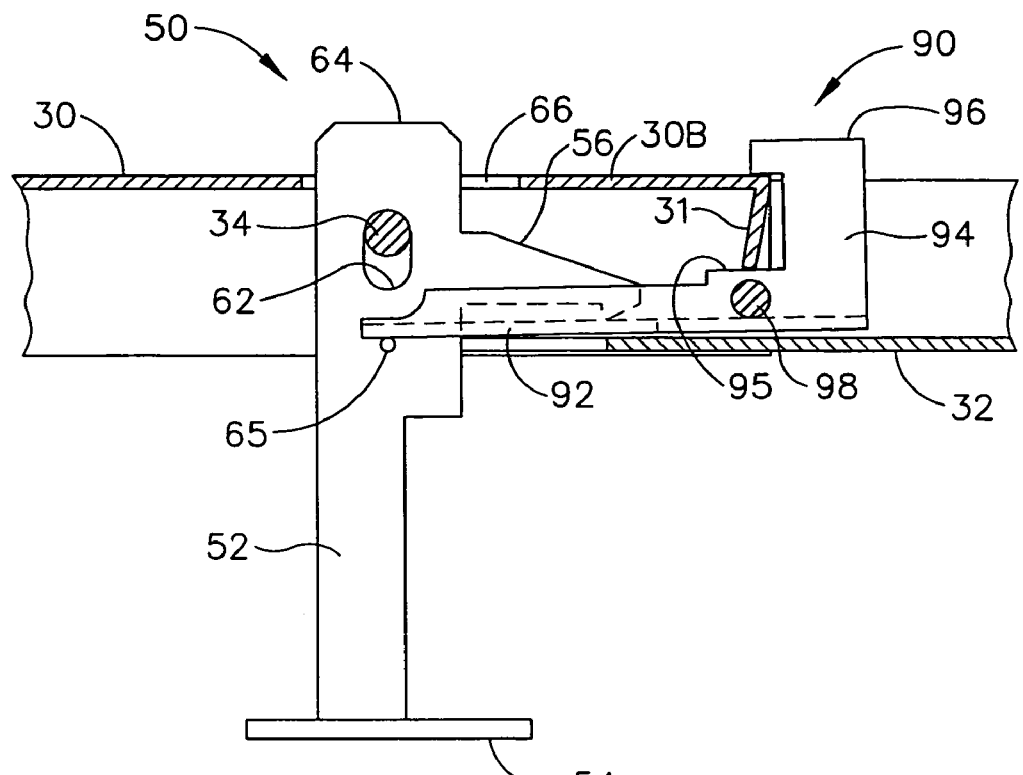
FIGS. 8 and 9 are a series of cross-sectional views of the trigger mechanism of the trap of FIG. 1 moving from an unactuated position to an actuated position.
Figure 9:
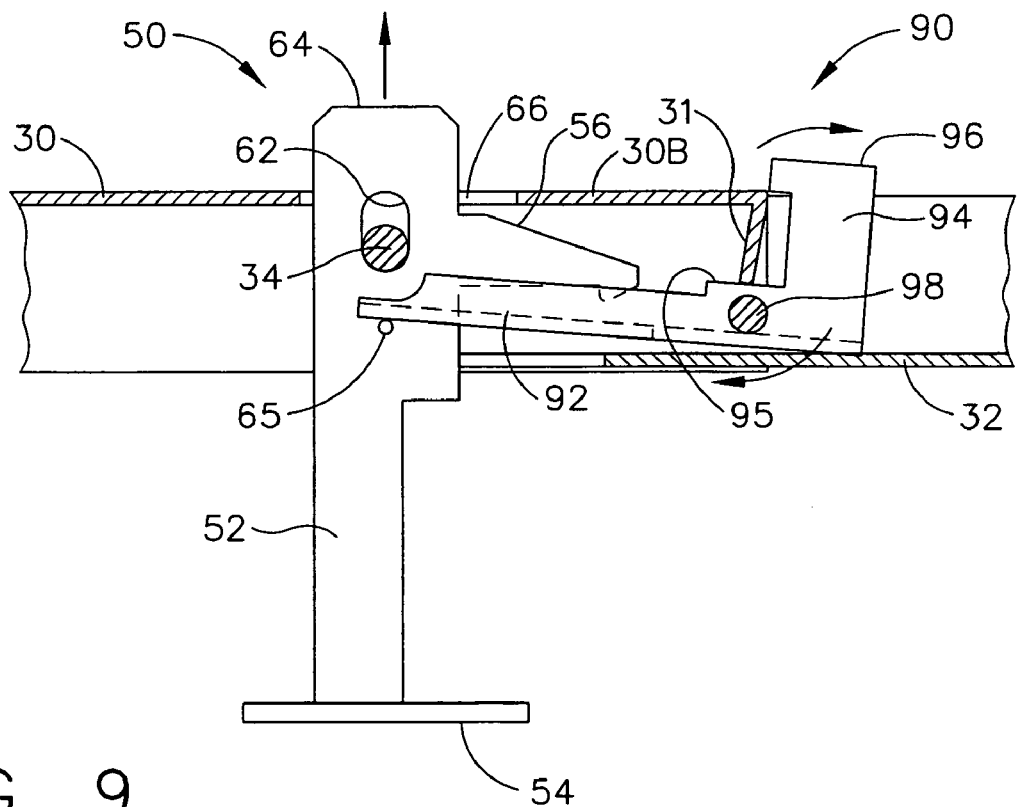

Arms 92 of clasp member 90 are configured to straddle trigger rod 52 when trigger mechanism 50 is assembled. Arms 92 may also straddle at least a portion of trigger arm 56. While two arms 92 are shown, it will be appreciated that clasp member 90 may have any number of arms. As shown in FIGS. 8–9, arms 92 of the present example are further configured to engage with pin 65, such that when trigger rod 52 is moved upward, pin 65 may communicate an upward force to arms 92. Of course such upward movement of trigger rod 52 may be caused by upward forces exerted on trigger plate 54, and may be facilitated by the elongate configuration of opening 62. It will be appreciated that the exertion of upward forces on arms 92 by pin 65 may effect rotation of clasp member 90 about hinge pin 98. Alternatively, any other structures or configurations suitable to cause rotation of clasp member 90 about hinge pin 98 may be used. It will also be appreciated that clasp member 90 or any other component of trigger mechanism 25 may be varied, substituted, or supplemented in any suitable way. By way of example only, while clasp member 90 is shown as being a single unitary part, clasp member 90 may alternatively comprise a plurality of parts, including but not limited to hinged levers, gears, a rack and pinion assembly, or any other suitable components or mechanisms.

In the present example, and as shown in FIGS. 2, 5–6, and 8, clasping portion 96 of clasp member 90 is configured to engage with second end 30B of first lever 30. As shown in FIG. 9, rotation of clasp member 90 about hinge pin 98 may cause disengagement of clasping portion 96 with second end 30B of first lever 30. Accordingly, due to engagement of pin 65 with arms 92, it will be appreciated that upward movement of trigger plate 54 may cause disengagement of clasping portion 96 with second end 30B of first lever 30. Exemplary effects of such engagement and disengagement between clasping portion 96 and second end 30B of first lever 30 will be described in greater detail below.

While FIG. 8 shows pin 65 being positioned immediately adjacent to arms 92 when trap 10 is in a set position, it will be appreciated that a gap may be provided between pin 65 and arms 92 when trap 10 is in a set position. Such a gap may permit some lost motion of trigger rod 52 relative to clasp member 90 before pin 65 engages arms 92. Such lost motion provided by such a gap may be desired in terrain susceptible to groundswell. In other words, when ground 80 in which trap 10 is set begins to swell, such swelling may urge trigger plate 54 and trigger rod 52 upward, which may result in unintended triggering of trap 10. A gap between pin 65 and arms 92 may thus accommodate such groundswell. Other ways for providing lost motion or otherwise accommodating groundswell will be apparent to those of ordinary skill in the art. Similarly, other suitable configurations of and relationships between trigger rod 52 and clasp member 90 will be apparent to those of ordinary skill in the art.

Figure 5:
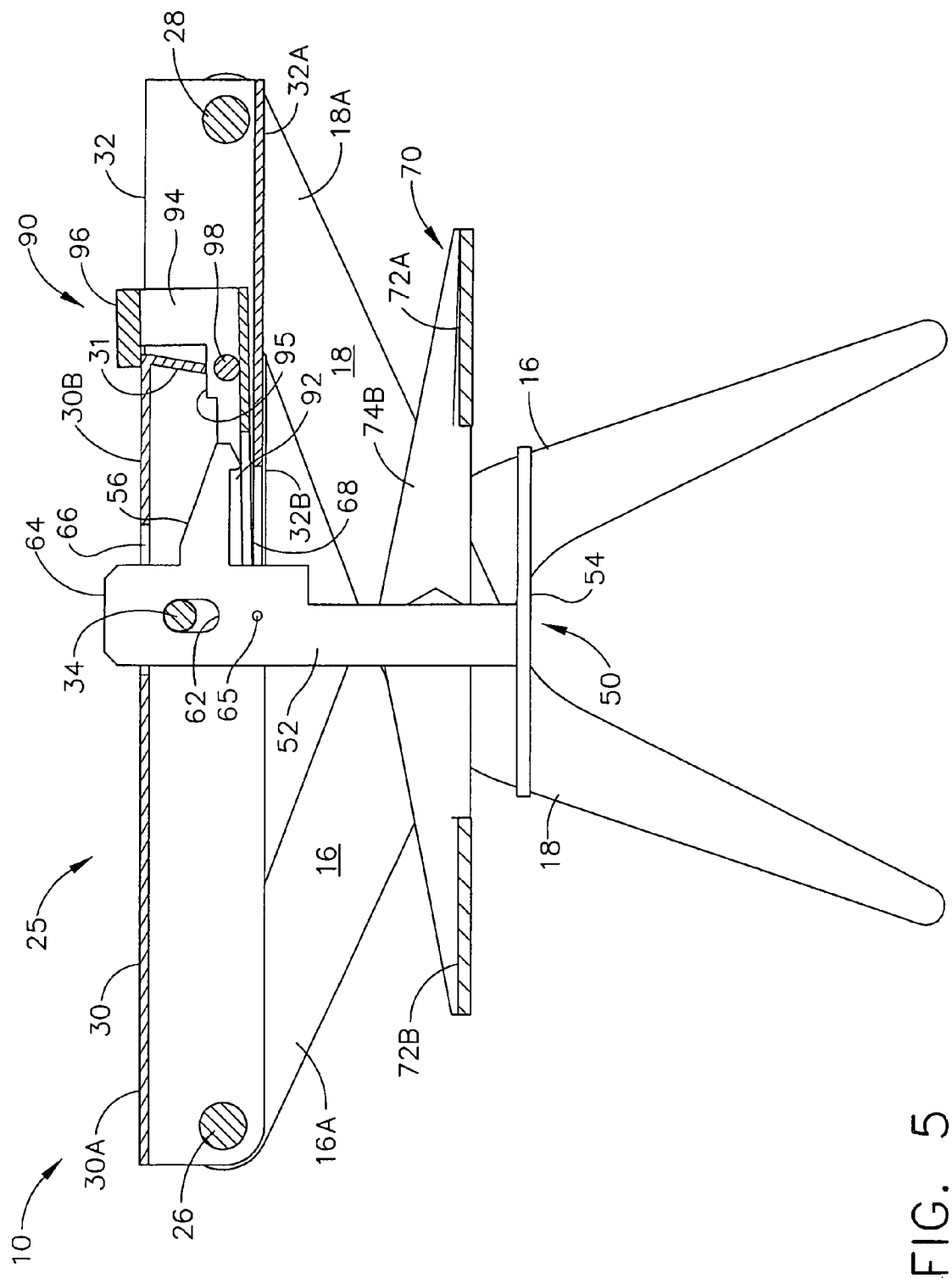
FIG. 5 is a cross-sectional side view of the mole trap taken along line 5—5 of FIG. 4.

As illustrated in FIGS. 1 and 5, an elongated slot 68 is provided in second end 32B of second lever 32. Slot 68 may guide trigger rod 52 when trap 10 is set. As shown in FIGS. 5 and 8–9, first lever 30 includes slot 66 near second end 30B, providing clearance for protuberance 64 on trigger mechanism 50. Slot 66 may also facilitate guidance of trigger mechanism 50 when trap 10 is set, such as by restricting lateral movement of trigger mechanism 50 along support bar 34. In one embodiment, where trap 10 is mounted on a hillside, and burrow 10 runs up and down the hillside, engagement between protuberance 64 and slot 66, and/or trigger rod 52 and slot 68, may inhibit undesired pendulous movement of trigger mechanism 50, thereby keeping trigger plate 54 substantially parallel to the ground 80. Where burrow 10 runs along the side of the hill, trigger arm 56, and/or trigger rod 52 and slot 68, may similarly stabilize trigger mechanism 50 and inhibit undesired pendulous movement. Of course, these components may provide other advantages. In addition, other components may provide these or similar advantages.

In one embodiment, clasp member 90 is configured such that steps 95 straddle tab 31 of first lever 30. In another embodiment, tab 31 is positioned between steps 95, such that tab 31 stabilizes clasp member 90 by restricting lateral movement of clasp member 90. In yet another embodiment, tab 31 and steps 95 are engaged, such that steps 95 may communicate an upward force upon tab 31. Other suitable relationships between tab 31 and steps 95 will be apparent to those of ordinary skill in the art.

In the present example, trap 10 is set when lever assembly 25 and trigger mechanism 50 are in a set position. When trap 10 is set, lever assembly 25 and trigger mechanism 50 will sufficiently resist forces exerted by springs 40 and 42 to maintain the set position. In the present example, when trigger mechanism 50 is tripped (e.g., by sufficient upward movement of trigger rod 52), lever assembly 25 will essentially "collapse," such that forces exerted by springs 40 will cause trap 10 of the present example to close. As used herein, the term "collapse" shall be read to describe any configuration or action of lever assembly 25 whereby trap 10 is closed and/or closing. Accordingly, unless trap 10 of the present example is set (e.g., such that lever assembly 25 and trigger mechanism 50 are in a set configuration), lever assembly 25 will be collapsed.

In the present example, the relative vertical positioning of support bar 34 and connecting rods 26 and 28, and the urging of springs 40, cause lever assembly 25 to be biased toward collapsing. This bias is resisted by clasp member 90. In other words, in the present example, engagement between clasping portion 96 and second end 30B of first lever 30 prevents lever assembly 25 from collapsing, and therefore maintains trap 10 in a set position. However, upon disengagement between clasping portion 96 and second end 30B of first lever 30 (e.g., by rotation of clasp member 90 caused by upward movement of pin 65 against arms 92), the relative vertical positioning of support bar 34 and connecting rods 26 and 28, and the urging of springs 40, may cause lever assembly 25 to collapse. Collapse of lever assembly 25 may be further provided by communication of an upward force on tab 31 by steps 95. Thus, in the present example, it will be appreciated that clasp member 90 is the only component to keep trap 10 in a set position.

Of course, it will also be appreciated that components other than clasp member 90 may keep trap 10 in a set position. Such components may substitute or supplement clasp member 90. For instance, lever assembly 25, support bar 34, connecting rods 26 and 28, and/or other components may be configured such that trap 10 may remain in a set position even when clasping portion 96 is disengaged from second end 30B of first lever 30. For instance, in another embodiment, relative vertical positioning of support bar 34 and connecting rods 26 and 28 is such that trap 10 may remain in a set position even without engagement of clasping portion 96 and first lever 30. In this alternate embodiment, support bar 34 and/or some other portion(s) of levers 30, 32 need an upward force to be exerted upon them in order to effect collapsing of lever assembly 25. An upward force upon or movement of support bar 34 sufficient to effect closure of trap 10 may be provided by trigger mechanism 50 or clasp member 90. In other words, an upward force upon or movement by trigger plate 54 may cause lever assembly 25 to collapse by forcing support bar 34 upward or first lever 30 upward, by way of example only. Those of ordinary skill in the art will therefore appreciate that trigger mechanism 50 may be operable to communicate force exerted on plate 54 to at least a portion of lever assembly 25. Such communication of force may be sufficient to offset lever assembly 25, thereby permitting first jaw 15 and second jaw 19 to close.

Those of ordinary skill in the art will also appreciate that the communication of force from trigger mechanism 50 to lever assembly 25 may occur at more than one contact point. By way of example only, one such contact point may be located proximate to opening 62, support bar 34, steps 95, tab 31, and/or elsewhere. Force exerted at such contact point(s) may be in a generally upward direction. As another merely illustrative example, another contact point may be located proximate to the end of trigger arm 56. At this end, force may be exerted in a generally downward direction, by way of example only. In one embodiment, trigger arm 56 exerts a downward force on second lever 32 and an upward force on first lever 30. Trigger arm 56 may thus provide leverage for exertion of upward force upon support bar 34. Still other suitable ways in which force may be communicated from trigger mechanism 50 to lever assembly 25 will be apparent to those of ordinary skill in the art.

While lever assembly 25 has heretofore been described as collapsing upon exertion of an upward force or forces from trigger mechanism 50, it will be appreciated that lever assembly 25 and/or trigger mechanism 50 may be configured such that a downward force from trigger mechanism 50 causes lever assembly 25 to collapse. For instance, where a line ("center line") is drawn perpendicular from the axis of first support rod 26 to the axis of second support rod 28, the axis of support bar 34 may be located above this line when trap 10 is set. In one version of this embodiment, lever assembly 25 may collapse when the axis of support bar 34 passes below this center line. Still other ways in which trigger mechanism 50 may cause lever assembly 25 to collapse, and other ways in which lever assembly 25 may collapse, will be apparent to those of ordinary skill in the art.

As shown in FIGS. 1–6, a platform, indicated generally at 70, is secured to mole trap 10 by fasteners 20 and 22. Platform 70 is positioned between jaws 15 and 19. Positioning platform 70 inside jaws 15 and 19 may reduce a tendency of trap 10 to sink when set in wet soil, may reduce manufacturing costs, and/or may improve the size or ease of trap 10 packaging. Alternatively, platform 70 may be positioned outside jaws 15 and 19; or both inside and outside jaws 15 and 19. Platform 70 is a generally rectangular structure that includes horizontal planar members 72A and 72B and vertical sidewalls 74A and 74B.

Planar members 72A and 72B and vertical sidewalls 74A and 74B define opening 78 in platform 70. As shown, platform 70 and trigger mechanism 50 are configured such that trigger plate 54 is located proximate to opening 78 when trap 10 is set. Planar members 72A and 72B and plate 54 are sized to prevent a mole from escaping through opening 78 when trap 10 is set. Of course, the foregoing configurations are merely illustrative, and other suitable configurations, including but not limited to sizing and positioning of various platform 70 features, will be apparent to those of ordinary skill in the art.

Platform 70 may be pivotally connected to first and second jaws 15 and 19. As illustrated in FIGS. 1–6, fasteners 20 and 22 are inserted through sidewalls 74A and 74B. Fasteners 20 and 22 permit platform 70 to pivot relative to the remainder of trap 10. Any suitable fastener or securing means, including but not limited to, nuts, protrusions, caps, cotter pins, and the like, may be used. It will also be appreciated that any suitable means for facilitating pivotal movement of platform 70 may be used, such as nylon washers by way of example only. For instance, nylon washers may be positioned at any suitable location about fasteners 20 or 22 to facilitate such pivotal movement. Other suitable means for facilitating pivotal movement, including but not limited to various structures and materials, will be apparent to those of ordinary skill in the art.

Figure 2:
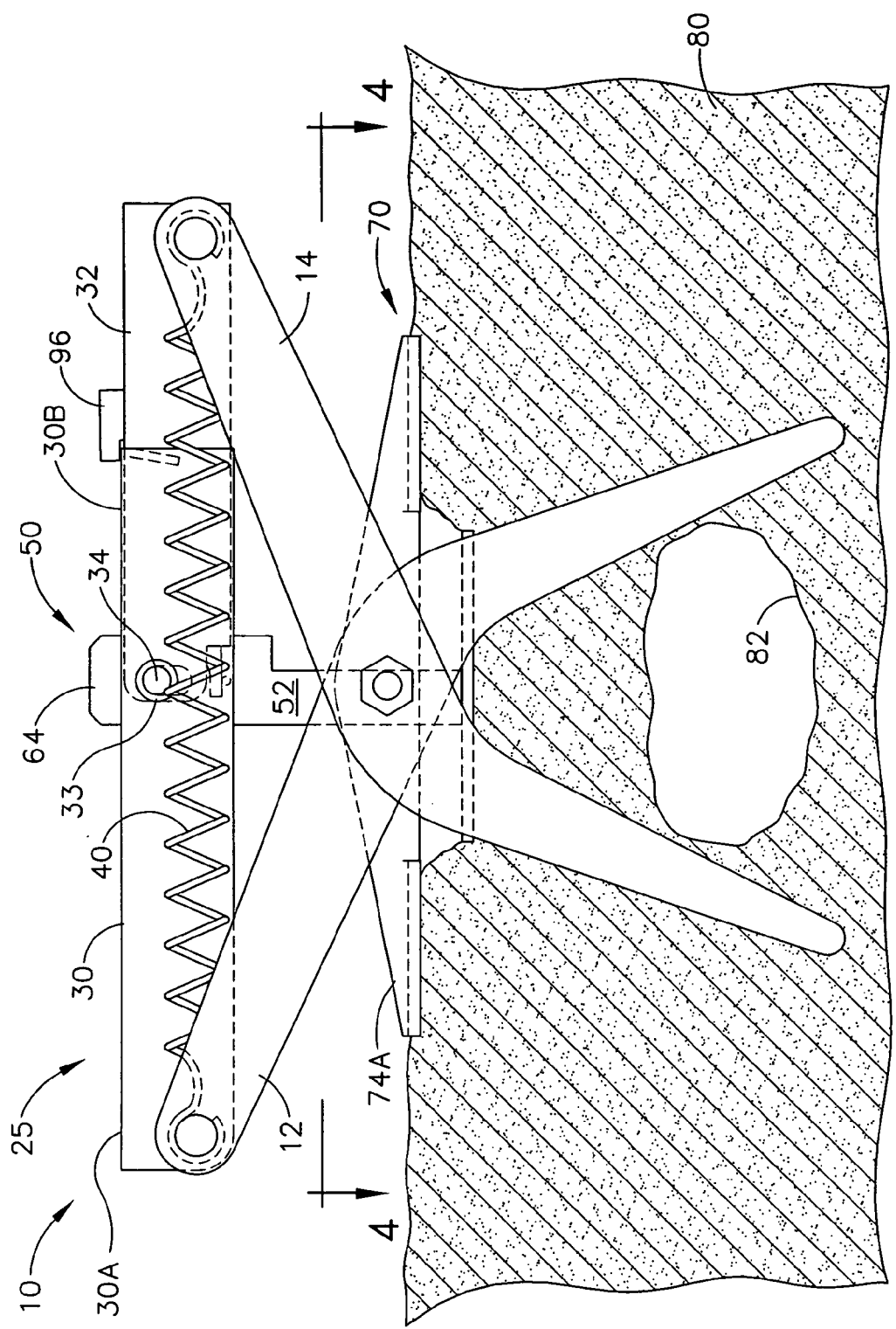
FIG. 2 is a side elevational view of the mole trap of FIG. 1 shown set in the ground adjacent a mole burrow.

In the present example, platform 70 is operable to rotate about fasteners 20 and 22. An exemplary effect of such rotation may be seen in FIGS. 2 and 6, which shows how the orientation of platform 70 may affect the depth of trap 10 within ground 80. In FIG. 2, horizontal planar members 72A and 72B are positioned between ground 80 and vertical sidewalls 74A and 74B. This orientation of platform 70 provides a first depth of trap 10 within ground 80. In one embodiment, at the first depth, blade ends 12B, 14B, 16B, 18B extend approximately 4½" below ground 80 level. Of course, any other first depth may be provided.

Figure 6:
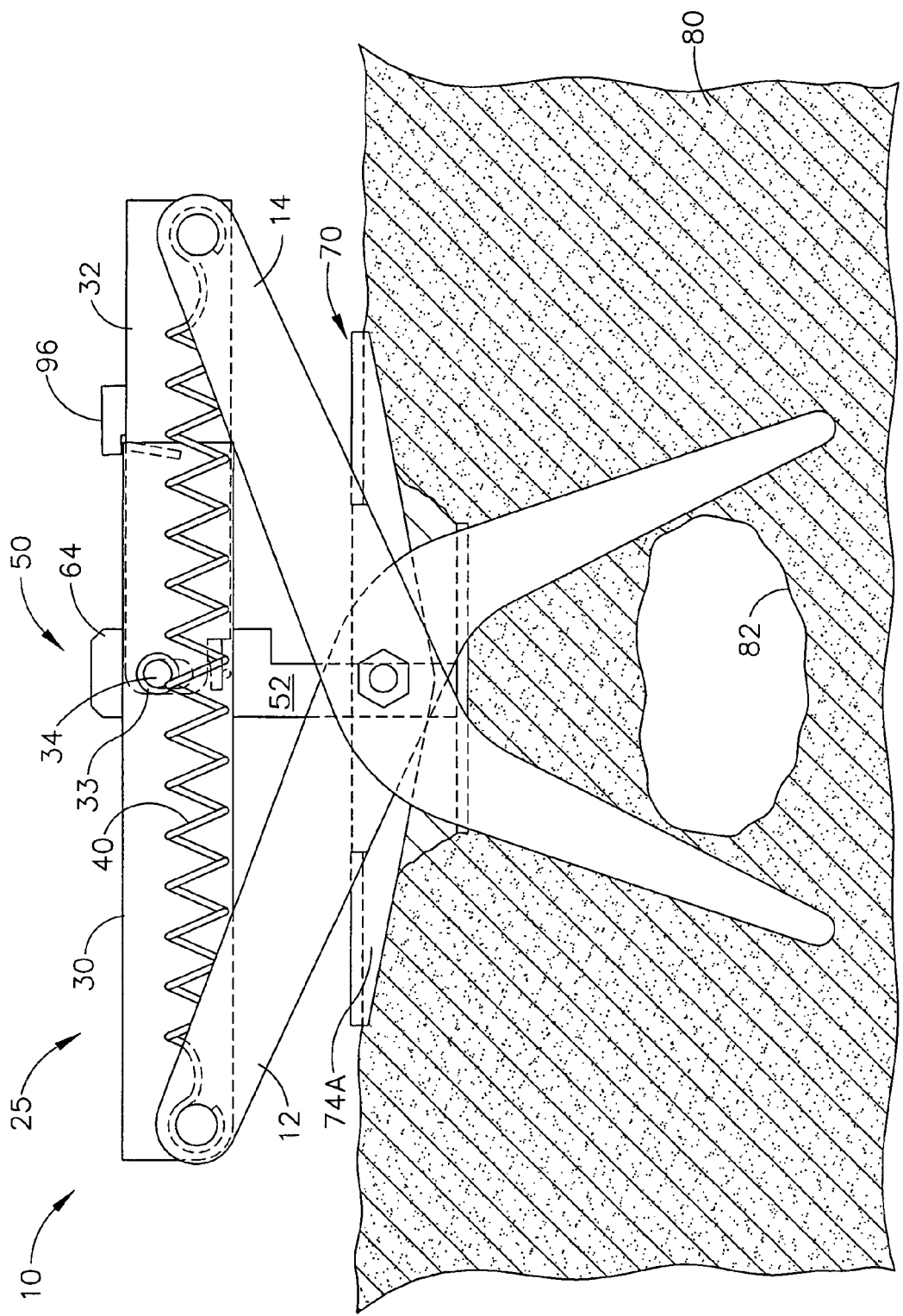
FIG. 6 is a cross-sectional view of the trap of FIG. 2 with the platform rotated 180° to lower the depth of the trap relative to the ground.
Figure 7:
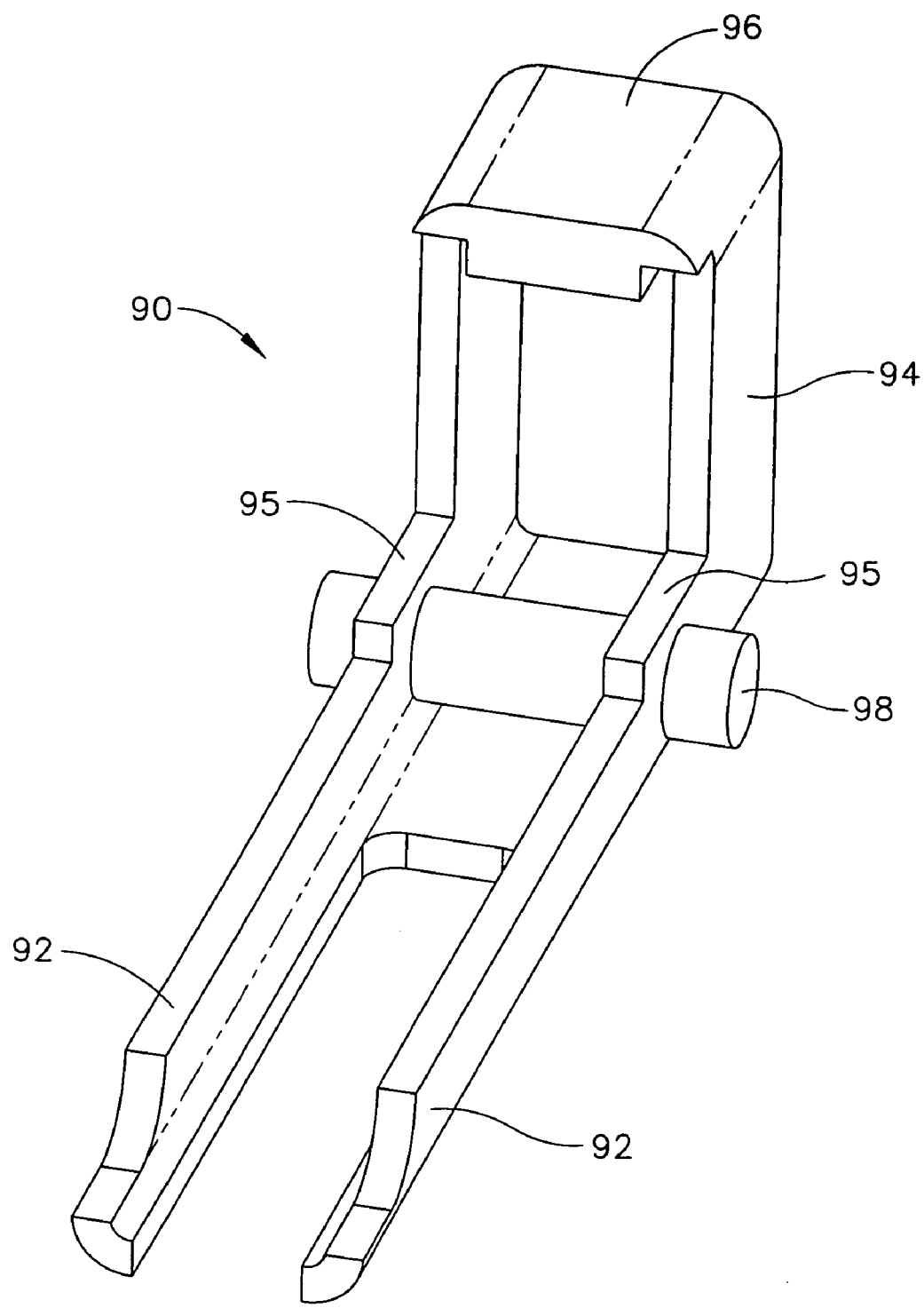
FIG. 7 is a perspective view of the clasp member of the trap of FIG. 1.

In FIG. 6, platform 70 has been rotated 180° relative to the orientation shown in FIG. 2, such that vertical sidewalls 74A and 74B are positioned adjacent to ground 80. This orientation of platform 70 provides a second depth of trap 10 within ground 80. As shown, the trap 10 is positioned deeper within the ground at the second depth than at the first depth. It will be appreciated that the depth of trap 10 may be varied by a user based on a variety of considerations, including but not limited to the depth of a mole run 82 over which trap 10 is sought to be positioned, for use in mulch beds, etc. Users may also prefer to have a shallower trap 10 placement, such as that depicted in FIG. 2, in dryer soil conditions; with a deeper trap 10 placement, such as that depicted in FIG. 6, in wetter soil conditions (e.g., spring) or when/where moles have a tendency to dig deeper runs 82.

In another embodiment, vertical sidewalls 74A and 74B have a plurality of openings through which fasteners 20 and 22 may be inserted. Such openings may be vertically spaced and aligned, and fasteners 20 and 22 may be configured to be selectively removable by users. Other ways in which the depth of trap 10 may be selectively varied will be apparent to those of ordinary skill in the art.

Figure 3:
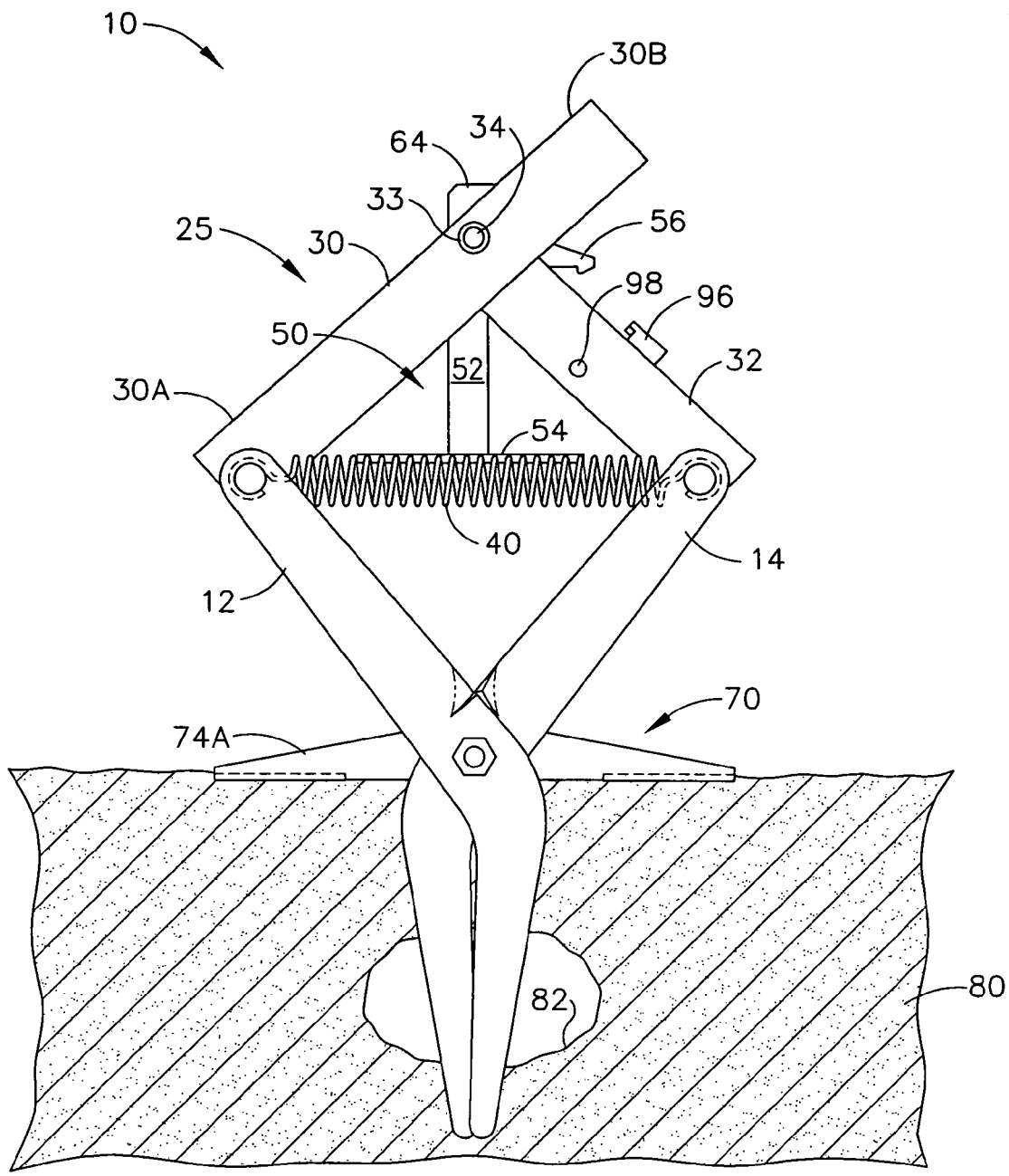
FIG. 3 is a side elevational view of the mole trap of FIG. 2 after the trap has been released to a closed position.
Figure 4:
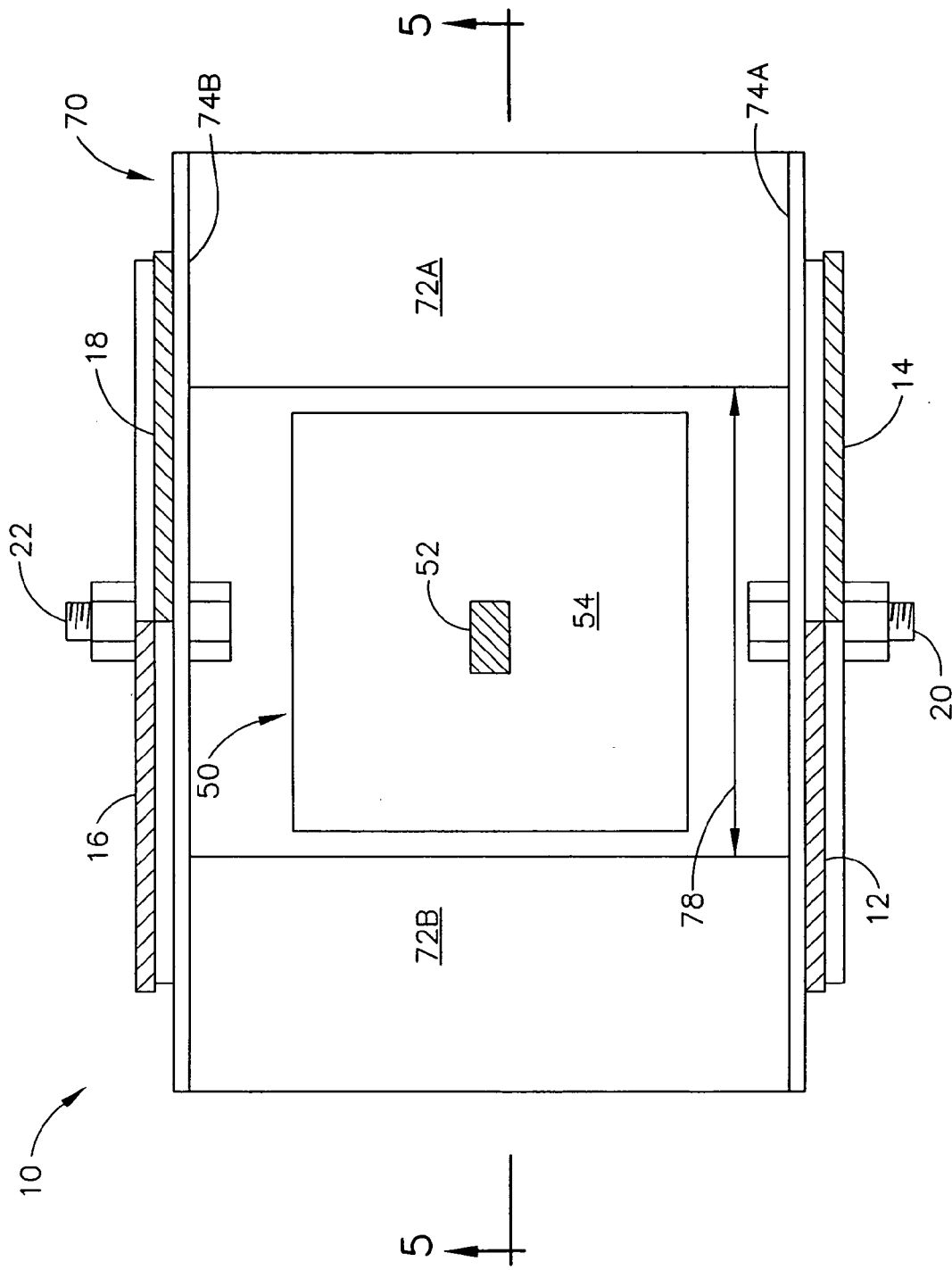
FIG. 4 is a partial cross-sectional view of the mole trap taken along line 4—4 of FIG. 2.

An exemplary installation and operation of mole trap 10 is illustrated in FIGS. 2 and 3. A force is applied on second end 30B of first lever 30 to open first and second jaws 15 and 19. As a force is applied downwardly, first and second levers 30 and 32 provide a lever action to force connecting rods 26 and 28 away from each other against the force of springs 40 and 42. As first lever 30 approaches a set orientation, first and second jaws 15 and 19 are opened. Weight of arms 92 urges clasp member 90 to rotate about hinge pin 98, such that clasping portion 96 engages with second end 30B of first lever 30. With clasping portion 96 engaged with second end 30B of first lever 30, trap 10 is locked in a set position.

Jaws 15 and 19 are inserted into ground 80 on either side of mole burrow 82. As trap 10 is inserted into ground 80, platform 70 may provide resistance for trap 10 from being pushed too far into ground 80, so that the hinge points provided by fasteners 20 and 22 remain above the ground. Of course, as shown in FIG. 6, fasteners 20 and 22 may be positioned below ground level. Planar members 72A and 72B provide a contact surface between trap 10 and ground 80. Platform 70 may be tilted about fasteners 20 and 22 to achieve a desired orientation. Furthermore, platform 70 may stabilize trap 10 and may prevent trap 10 from shifting when trap 10 is set in the ground.

It will also be appreciated that trap 10 may be set and inserted into ground 80 simultaneously. For instance, trap 10 may first be positioned at the desired location above ground 80 in a generally collapsed configuration. The user may then step on lever assembly 25 to urge lever assembly 25 toward a set position. The user may therefore use his or her own weight to drive trap 10 into the ground and set trap 10. By positioning his or her foot generally over protuberance 64 while pushing downward, the user may further ensure that trigger rod 52 is at a lowermost position, such as the position shown in FIG. 8, thereby promoting engagement of clasping portion 96 of clasp member 90 with first lever 30. Still other suitable methods of setting trap 10 will be apparent to those of ordinary skill in the art.

In another embodiment of setting trap 10, trap 10 is pushed downward into ground 80 until the bottom of burrow 82 is reached. The user then adds dirt or other material underneath platform 70 and trigger plate 54. This embodiment may be desirable for users who have difficulty in pushing trap 10 into ground 80 to a depth sufficient to cause contact between platform 70 and ground 80 and/or trigger plate 54 and ground 80. Still other suitable methods for setting trap 10 will be apparent to those of ordinary skill in the art.

When a mole travels in mole burrow 82, vibrations or other disturbances may be transmitted through ground 80 to plate 56. As plate 54 is nudged sufficiently upwardly, pin 65 causes clasp member 90 to rotate out of engagement with first lever 30, such that lever assembly 25 collapses. Springs 40 and 42 immediately close first and second jaws 15 and 19 to destroy the animal. In FIG. 3, trap 10 is shown in a closed position in mole burrow 82.

In still another embodiment, trigger plate 54 is configured to push downward on ground 80 above mole run 82 when trap is inserted and set in ground 80. Plate 54 may thus reduce the effective vertical diameter of mole run 82, and may further compress the ground 80 above mole run 82, thereby increasing the likelihood that a mole passing though run 82 below trigger plate 54 will cause sufficient upward forces to be exerted on trigger plate 54 to trigger trap 10. The user may also step on the ground 80 above the region where trap 10 will be placed to compact ground 80 and/or reduce the effective vertical diameter of mole run 82.

In the present example, planar members 72A and 72B and trigger plate 54 are configured to reduce the likelihood that trap 10 will sink over time in wet soil after trap 10 has been set.

It will be appreciated that trap 10 may also be placed in a mole mound or molehill. Furthermore, regardless of whether being positioned over a mole run 82 or a mole mound, trap 10 may be set without the need to step on ground 80, dig in ground 80, or otherwise engage in preparatory efforts prior to setting trap 10. Nevertheless, a user may wish to insert a probe (e.g., a rod) into ground 80 prior to setting trap 10 to gauge the depth of mole run 82. For instance, a user may remove a molehill using any suitable technique to reveal a mole exit hole, then insert a probe into ground 80 adjacent to the mole exit hole to gauge the depth of mole run 82. Based on the depth indicated by the probe, the user may orient platform 70 as appropriate and set trap 10. Alternatively, the user may set trap 10 directly over the mole exit hole, such that trigger plate 54 blocks exit through the hole and causes trapping or severing of a mole attempting to exit through the hole.

It will also be appreciated that a user may desire to change the location of a trap 10 after it has been set but before trap 10 has been triggered. To the extent that a set trap 10 would be dangerously sensitive to such movement, the user may desire to trigger trap 10 or otherwise change it from a set to a collapsed configuration prior to moving trap 10. In one embodiment, clasp member 90 is configured such that the user may step on the clasping portion 96 of clasp member 90 to cause it to disengage first lever 30. As described above, such disengagement may cause trap 10 to collapse, thereby permitting the user to safely relocate trap 10. It will therefore be appreciated that trap 10 of the present example may be both set and triggered by a user stepping on trap 10. Other suitable methods for intentionally triggering trap 10 will be apparent to those of ordinary skill in the art.

When set (see FIGS. 2 and 6), trap 10 of the present example has a low profile close to ground 80.

As illustrated in FIG. 2, trigger mechanism 50 is substantially shielded by support ends 12A, 14A, 16A and 18A; and levers 30 and 32. Therefore, the upper construction of trap 10 may reduce the likelihood of accidental releases of trap 10. Other suitable ways of preventing accidental releases of trap 10 will be apparent to those of ordinary skill in the art.

A stop may be provided on the angled members 12, 14, 16 and 18 to limit the range of motion when the jaws 15 and 19 are closed. In one embodiment, a flange is provided near the mid-point of angled member 12. In a similar manner, a flange may also be provided on angled member 18. When jaws 15 and 19 are not open, the range of closure is limited as flanges engage angled members 14 and 16, respectively, thereby preventing injury to fingers or hands that are between support ends 12A, 14A, 16A and 18A. Alternatively, or additionally, flanges may limit the range of closure by engaging each other. It is understood that flanges may be provided on angled members 14 and 16 in orientation so as to engage angled members 12 and 18, if desired. Also, it is understood that any suitable number of flanges or flange alternatives may be used, including none at all.

Mole trap 10 may be constructed from stainless steel to resist weather and corrosion. Furthermore, it may be difficult for a mole to smell the stainless steel thereby making the animal unaware that the trap is set in place about its burrow 82. Alternatively, any other suitable material or materials may be used to construct trap 10.

In summary, numerous benefits have been described which result from employing concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate principles of the invention and its practical application to thereby enable one of ordinary skill in the art to utilize the invention in various embodiments and with various modifications as are suited to the particular use contemplated. It is intended that the scope of the invention be defined by the claims appended hereto.

What is claimed is:

1. A mole trap, comprising:
   (a) a first pair of angled members hinged together to form a first jaw, wherein each angled member of the first pair terminates in a blade end and an opposite support end;
   (b) a second pair of angled members hinged together to form a second jaw, wherein each angled member of the second pair terminates in a blade end and an opposite support end;
   (c) a lever assembly in mechanical communication with the support ends of the first and second jaws, the lever assembly being configured to urge the first and second jaws in an open position when the lever assembly is in a set position, wherein the lever assembly comprises a first lever and a second lever; and
   (d) a trigger mechanism in mechanical communication with the lever assembly, the trigger mechanism comprising:
      (i) a trigger rod having a first end and a second end,
      (ii) a trigger plate connected to the first end of the trigger rod, and
      (iii) a clasp member in communication with the trigger rod, wherein the clasp member is configured to selectively engage a portion of the lever assembly to keep the mole trap in an open position, wherein the clasp member is substantially parallel to the first lever and the second lever when the mole trap is in the open position.

2. The mole trap of claim 1, further comprising one or more resilient members in mechanical communication with the first and second jaws, the one or more resilient members urging the first and second jaws to a closed position.

3. The mole trap of claim 1, wherein the clasp member is pivotally secured to the lever assembly with a hinge pin.

4. The mole trap of claim 1, wherein the trigger rod further comprises a transverse member, wherein the transverse member is configured to selectively engage the clasp member.

5. The mole trap of claim 4, wherein the transverse member is configured to cause at least a portion of the clasp member to rotate in response to upward movement of the trigger rod.

6. The mole trap of claim 4, wherein the transverse member comprises a pin.

7. The mole trap of claim 1, wherein the lever assembly comprises:

(a) a first connecting rod secured to the support ends of one of the angled members of the first jaw and a complementary angled member of the second jaw;

(b) a second connecting rod secured to the support ends of the remaining angled members of the first and second jaws;

(c) a resilient member connected to the first and second connecting rods for biasing the jaws in a closed position;

(d) a first lever pivotally connected to the first connecting rod; and (e) a second lever pivotally connected at a first end to the second connecting rod and pivotally connected at a second end to the first lever.

8. The mole trap of claim 7, wherein the second lever is pivotally connected to a support bar secured to the first lever.

9. The mole trap of claim 8, wherein the support bar passes through a portion of the trigger mechanism.

10. The mole trap of claim 7, wherein the clasp member is configured to rotate about a hinge pin engaged with the second lever to selectively engage or disengage the first lever.

11. The mole trap of claim 1, further comprising a platform pivotally connected to the first and second jaws.

12. A method of setting a mole trap, the method comprising:
(a) providing a mole trap, wherein the mole trap comprises:
  (i) a pair of resiliently-loaded jaws having a range of movement from an open position to a closed position, wherein each of the jaws has a pair of lowermost ends,
  (ii) a lever assembly in mechanical communication with the jaws, the lever assembly being operable to urge the trap to the open position,
  (iii) a trigger mechanism in mechanical communication with the lever assembly, wherein the trigger mechanism comprises a clasp member, wherein the clasp member is operable to selectively engage a portion of the lever assembly or release the trap to the closed position, and
  (iv) a platform hingedly connected to the jaws, wherein the platform comprises a generally rectangular structure having a pair of vertical sidewalls and a pair of horizontal planar members, wherein the jaws have an inside and an outside, wherein the platform is positioned within the inside of the jaws, wherein the platform is adjustable to selectively vary the vertical distance between the horizontal planar members and the lowermost ends of the jaws;
(b) adjusting the platform to provide a selected vertical distance between the horizontal planar members and the lowermost ends of the jaws, wherein the act of adjusting the platform comprises rotating the platform approximately 180°; and
(c) setting the mole trap in the ground.

13. The method of claim 12, wherein the vertical sidewalls and horizontal planar members define a generally rectangular opening in the platform.

14. The method of claim 12, wherein the act of setting the mole trap comprises stepping on the lever assembly to set the trap in the open position.

15. The method of claim 12, wherein the trigger mechanism further comprises:
a trigger rod having a first end and a second end, wherein the trigger rod is connected to the lever assembly at the first end of the trigger rod, and
a trigger plate connected to the second end of the trigger rod.

16. The method of claim 15, wherein the trigger rod has a transverse member configured to communicate force to the clasp member in response to upward force exerted on the trigger plate.

17. The method of claim 12, wherein at least a portion of the clasp member is mounted to a hinge pin, wherein the hinge pin is engaged with the lever assembly, wherein the clasp member is configured to rotate about the hinge pin to selectively engage or disengage a portion of the lever assembly.

18. A mole trap, comprising:
(a) a pair of resiliently-loaded jaws having a range of movement from an open position to a closed position;
(b) a lever assembly in mechanical communication with the jaws, wherein the lever assembly comprises a first lever pivotally connected to a second lever, wherein the levers are operable to urge the jaws to the open position; and
(c) a trigger mechanism in mechanical communication with the lever assembly, the trigger mechanism comprising:
  (i) a trigger rod having a first end and a second end, wherein the trigger rod is engaged with the lever assembly at the first end, wherein the trigger rod has a transverse member extending transversely relative to the trigger rod,
  (ii) a trigger plate connected to the second end of the trigger rod, and
  (iii) a clasp member hingedly secured to the second lever, wherein the clasp member has at least one arm, wherein the transverse member of the trigger rod is configured to selectively engage the at least one arm of the clasp member to cause the clasp member to rotate, wherein the clasp member is configured to selectively secure the first lever to maintain the jaws in a set position, wherein the clasp member is configured to disengage the first lever upon rotation of the clasp member caused by movement of the transverse member of the trigger rod against the at least one arm of the clasp member.

* * * * *